Dec. 2, 1969  G. W. HARPER  3,481,629
SYSTEM OF OPERATING CLOSE COUPLED TRAILER UNITS
Filed May 16, 1967  5 Sheets-Sheet 2

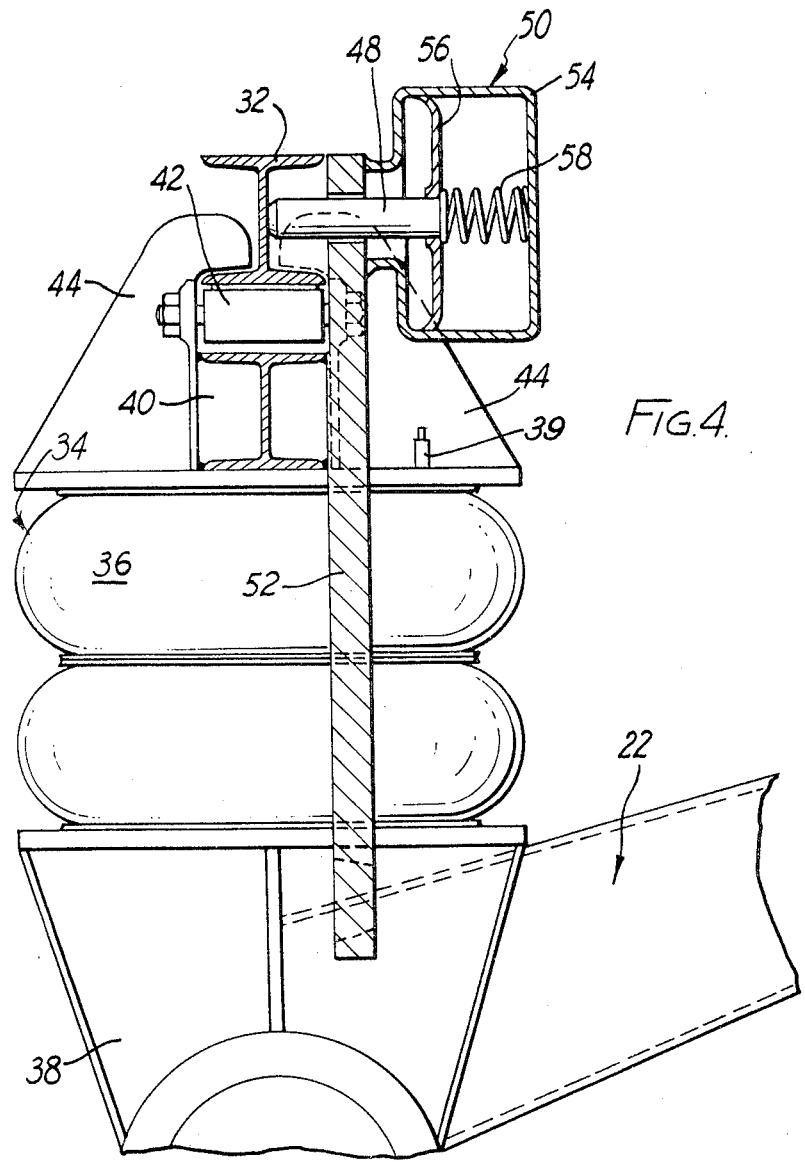

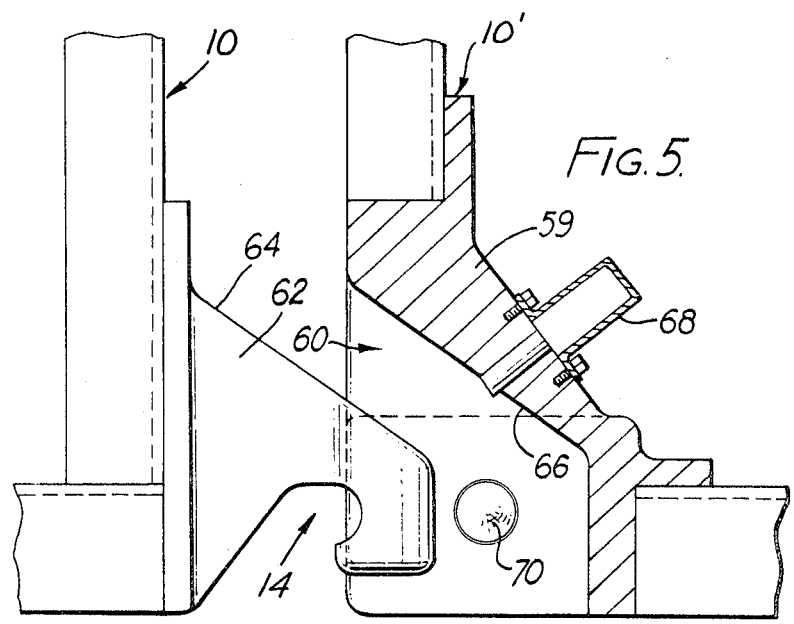
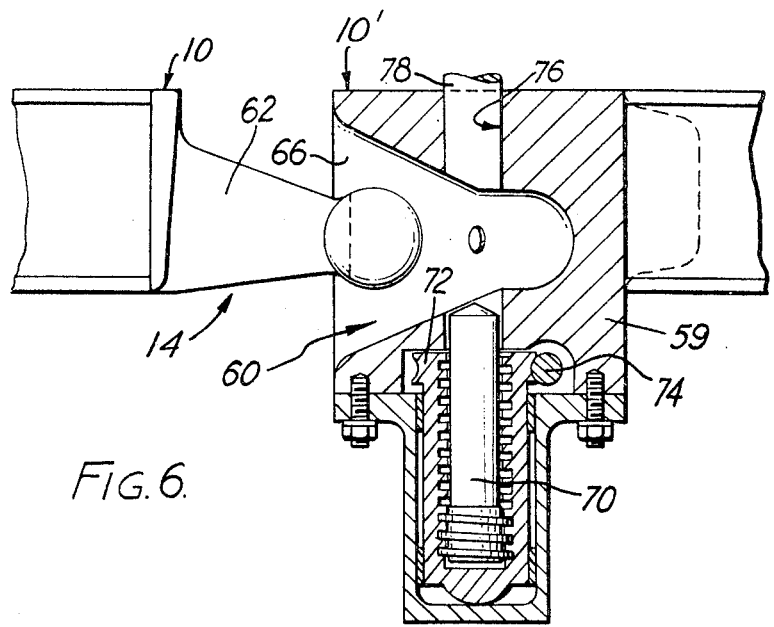

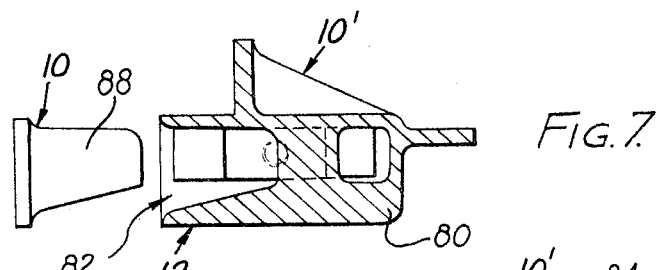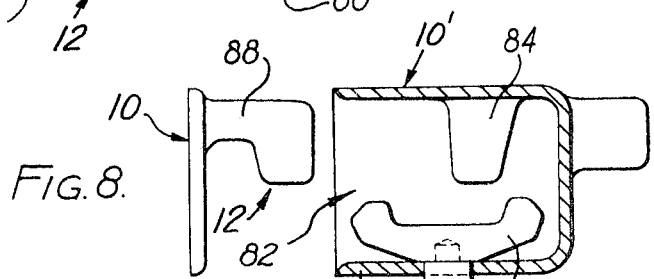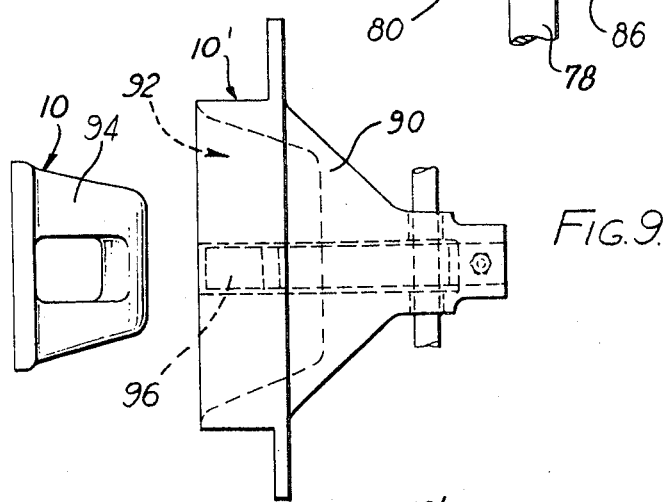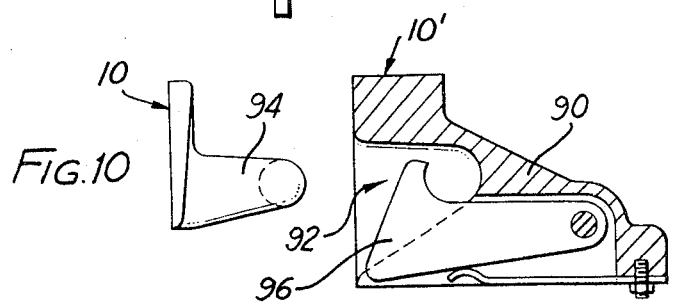

United States Patent Office 3,481,629
Patented Dec. 2, 1969

3,481,629
SYSTEM OF OPERATING CLOSE COUPLED TRAILER UNITS
George Whitwell Harper, Clitheroe, England, assignor to Primrose Third Axle Company, Limited, Blackburn, England, a company of Great Britain and Northern Ireland
Filed May 16, 1967, Ser. No. 638,913
Claims priority, application Great Britain, May 18, 1966, 21,990/66
Int. Cl. B62d 53/00, 13/00
U.S. Cl. 280—415
11 Claims

ABSTRACT OF THE DISCLOSURE

A vehicle trailer for coupling end-to-end with a similar trailer and which has a rear axle which in one position is held locked, and in another position is free to execute steering movements, and there is a release means on the trailer which releases the lock on the axle when the trailer is brought end-to-end with another similar trailer.

---

Vehicle trailer units in present day use are such that the trailer unit is hitched to the rear of a traction vehicle and is pulled thereby. However, when it is desired to increase the capcity of the trailer unit, the known method is simply to increase its length and perhaps add another wheeled axle.

A disadvantage of the arrangement is that the elongated trailer after having been loaded and taken to a distribution centre must be unloaded onto smaller trailers or wagons, which then commence general distribution to the local retailers. Thus, the long trailer is unloaded gradually and naturally there is a considerable time during which the trailer stands idle.

Another arrangement is to provide a longer vehicle trailer onto which two or more large containers are loaded the containers containing goods for general distribution. Upon arriving at a distribution depot the containers are lifted, by expensive lifting tackle, from the trailer and deposited in a stationary location wherefrom general delivery vehicles gradually unload the trailers and deliver the goods to the local retailers.

It is an object of this invention to provide means whereby the necessity of having such expensive lifting tackle may be avoided.

According to this invention there is provided vehicle trailer unit having a front end and a rear end, the front end being adapted for coupling to a traction vehicle and the rear end having coupling means adapted for coupling to the front end of a similar vehicle trailer unit the unit being supported on wheels, towards the rear end thereof and front support means at the front end thereof, the coupling means and wheels being interconnected by means so that on coupling the rear end to the front of a similar trailer unit the wheels can change their angularity to the trailer unit to facilitate coupling.

By this means the coupling end to end of the trailer units is much simplified. For example, if the driver of a traction vehicle with one unit coupled thereto wishes to couple the rear end of said one unit to a similar unit then he merely backs the one unit towards the other. When coupling of the coupling means takes place, if the units are not in alignment then the angularity of the unit wheels will alter enabling the units to be easily brought into alignment and completely coupled.

Also, according to this invention there is provided a method of coupling two vehicle trailer units end to end comprising moving the ends of the trailer units together and allowing support wheels of one trailer unit to alter their angularity relative to the unit to enable the two units to become easily aligned in the case where they are not in alignment prior to coupling.

Each trailer unit will preferably be supported on wheels at the rear end thereof and support means at the front thereof and prior to coupling the rear trailer unit will rest on its support means and wheels. The front unit will preferably be backed into the rear unit whilst it is so standing and upon engagement with coupling means on the first trailer the front of the rear trailer unit will be raised to raise the support means from the ground to enable the rear wheels of the rear trailer unit to change their angularity if necessary.

In the case of a single trailer unit, the coupling means is coupled to the trailer support wheels such that in the uncoupled state the wheels are positionally fixed relative to the unit, but when coupled, these become free to change in angularity, in the manner of steered wheels to enable the units to be brought into alignment easily and also during transport of the units by a traction vehicle the wheels can change freely their angularity to prevent tire scrub when the vehicle and units are being driven in a curved path.

The coupling means preferably comprises several socket means engageable by tongues on the other unit and the means coupling the wheels and coupling means comprises an actuator and a lock, the actuator being actuable by a tongue of the other unit to release the lock which normally holds the wheels positionally fixed relative to the unit.

The coupling sockets are disposed at each side of the rear of the unit so that if the unit is backed towards another unit at some angle the appropriate tongue will engage a socket at the appropriate side actuate the actuator and release the lock enabling the wheels to change their angularity relative to the unit and therefore enabling the two units to be easily coupled together.

The unit preferably has retainer means to hold the tongues in the sockets when the units are completely coupled.

An embodiment of the invention will not be described, by way of example, only wherein:

FIG. 4 is an enlarged sectional view taken on the line IV—IV of FIG. 2;

FIGS. 5 and 6 are respectively an enlarged plan and elevation of one of the lower corner coupling catches coupling the two trailer units shown in FIG. 1;

FIGS. 7 and 8 are respectively an enlarged plan and elevation of one of the top corner coupling catches coupling the two trailer units shown in FIG. 1; and FIGS. 9 and 10 are respectively an enlarged plan and elevation of the centre coupling catch coupling the front and rear trailer units of FIG. 1.

Figure 1:
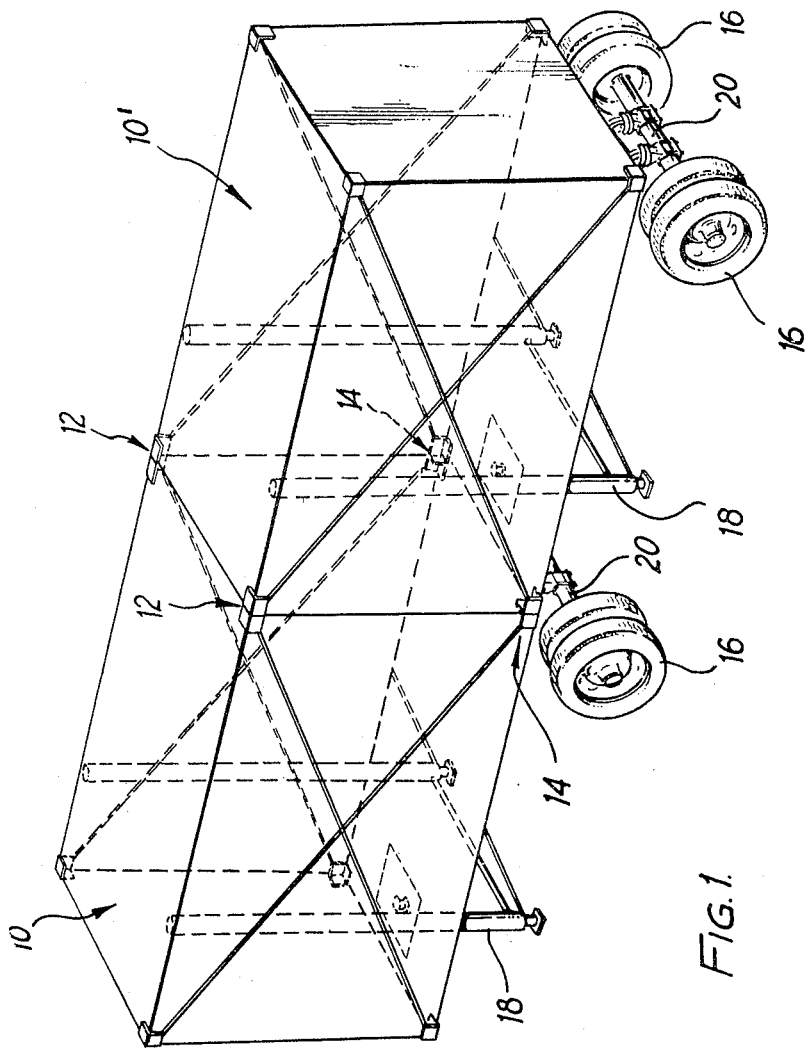
FIG. 1 is a diagrammatic perspective view of two trailer units according to the present invention coupled together.

Referring to the drawings, firstly to FIG. 1 two similar trailer units 10 and 10' are coupled end to end at four points indicated by 12 and 14 and by a centre coupling catch not shown in FIG. 1. The front end of the front unit 10 is adapted for connection to a traction vehicle whereby the two units may be trailed from place to place.

Each unit 10 and 10' is provided with support wheels 16 towards the rear thereof and support means in the form of support legs 18, which are extendible, for example, manually or by hydraulic means, towards the front end thereof. Thus, each trailer unit, when detached from the other end the traction vehicle is free standing.

Figure 2:
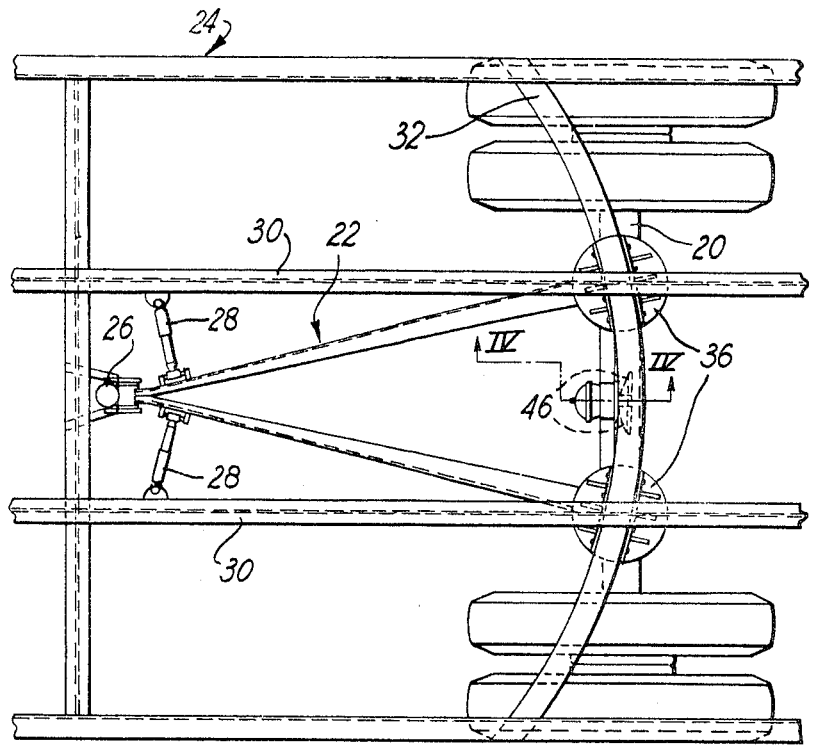
FIGS. 2 and 3 are respectively a part plan and part elevation of the chassis of one of the trailer units shown in FIG 1.

In the present example, the wheels 16 are at each end of a rear axle 20 to which is attached an A-frame 22 (FIGS. 2 to 4) which projects forwardly of the trailer unit and is connected at its apex to the trailer unit chassis 24 at universal joint 26. Damper units 28 act between the A-frame legs and longitudinal chassis members 30 and tend to centralize such A-frame 22 and axle 20.

Welded to the underside of chassis 24 is a curved rail 32 of I-section which forms a track on which the axle supporting structure 24 may run. Each trailer unit 10 and 10' is supported on the rear axle 20 through the intermediary of two assemblies 34 (FIG. 4). Each assembly 34 comprises an air bellow 36 which rests on a bracket 38 secured to the axle 20. There is an air release top for each bellows so that this may be exhausted to allow the rear of the chassis 22 to drop. On top of the bellows 36 is a further bracket 40 provided with two horizontal rollers 42 on which track 32 bears. Bracket 40 is provided with hooked retainer plates 44 which engage over the lower cross piece of track 32 to ensure that the assemblies 34 do not become detached from the track 32.

The track 32 is provided with two spaced cam surfaces 46 on the central web of track 32 and on the inside relative to the curvature thereof. These cam surfaces are for engagement by a lock pin 48 on a lock mechanism indicated generally by the numeral 50. The lock mechanism 50 is mounted on a torque plate 52 connected rigidly to the two brackets 40 and extending downwards therefrom between the two assemblies 34. Attached by a ball joint to the lower end of plate 52 is a rod (not shown) which is also connected through another ball joint, to an arm rigid with the axle 20. This arrangement is for providing horizontal stability between the axle 20 and the assemblies 34.

Figure 3:
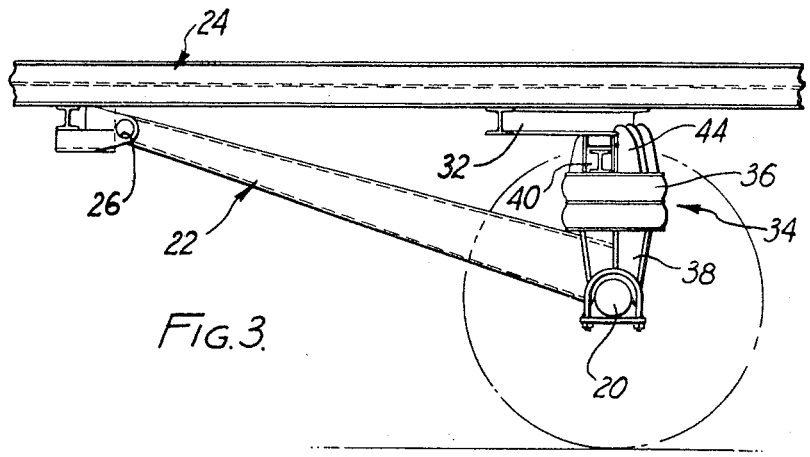

The lock mechanism 50 is an air cylinder 54 with a piston 56 slideable therein and the lock pin 48 forms the piston rod of said piston 56. There is a compression spring 58 acting between the cylinder 54 and piston 56 urging the pin 48 continuously towards the central web of the track 32. Therefore, when the wheels 16 are in the central position (as indicated in FIG. 3) and the unit is uncoupled from the rear unit, the pin 48 engages between cams 46 thereby preventing the assemblies 34, and hence wheels 16 from moving laterally of the trailer unit 10 along the track 32 to alter the angularity of wheels 16 relative to the unit 10 or 10'. When the pin 48 is disengaged (i.e. piston 56 pushed to the right in FIG. 4) the assemblies 34, axle 16 and wheels 16 can move along the track 32 to effect a steering movement of the axle 16.

Referring now to FIGS. 5 and 6 there is a corner coupling means as shown in these figures at each lower corner of the rear of the trailer unit. The coupling means at the other side of the trailer unit 10 or 10' from that shown is symmetrically disposed relative to the one shown.

The rear of each trailer 10 or 10' is provided with a casting 59 which has a socket 60 open to the rear of the vehicle unit 10 and also to the side of unit 10 or 10'. The socket 60 tapers outwardly in a rearwards direction to provide easy entry of a tongue 62 on the front end of the rear trailer unit 10'. There is a tongue 62 on each lower corner of the front of each unit 10 and 10'. The tongue is of convergent section in a forwards direction leading to a round section at the end and in plan it is hook-shaped with an inclined edge 64 for contact with an inclined side 66 in the socket 62 as shown in the plan, FIG. 5.

An actuator 68 projects through inclined side 66 so as to be contactible by the face 64. This actuator controls the supply of pressure air to the lock mechanism 50 and when contacted by face 66 causes piston 56 to be pushed rightwards in FIG. 4 to release lock pin 48 from cams 56.

At the lower portion of casting 58 there is a retaining means for retaining the tongue 62 in socket 60 after coupling and this comprises a vertical screw 70 screwed into the bore of a wormwheel 72. The wormwheel 72 is in engagement with a worm 74 which is turnable by a detachable handle carried by the driver of the traction vehicle which is for pulling the trailer units. Upon rotation of the worm 74 in the appropriate direction the screw 70 moves vertically upwards into socket 60 thereby trapping the tongue 62 therein. The screw moves through the socket 60 and into a bore 76 in alignment therewith and pushes upwardly a rod 78 contained in said bore 76.

Referring now to FIGURES 7 and 8, each top corner coupling means comprises a casting 80 having a socket 82 open to the rear of the trailer unit 10 or 10'. The socket houses a pair of clamping jaws 84 and 86 of which jaw 84 is fixed and jaw 86 is movable vertically. Jaw 86 is in fact connected to the top of rod 78 so that upon moving this rod upwards, jaw 86 is moved upwards to clamp hook-shaped tongue 88 on the front top corner of the rear trailer unit 10'.

Socket 82 diverges outwardly to the rear of the vehicle whilst tongue 88 tapers forwardly of the unit 10 to provide easy entry of the tongue 88 into the socket.

Finally, FIGS. 9 and 10 show a centre coupling means which is at the centre of the lower edge of the rear of each unit 10 and 10'. This coupling means is also used for aligning the two units 10 and 10' and comprises a casting 90 with a socket 92 of rearwardly diverging section both in plan and elevation and is for receiving an eye 94. A slot in the lower face allows a spring loaded retaining hook 96 to pass into the socket 92. When the eye 94 enggaes the socket 92 initially pushes the hook 96 out of the way, but this springs back into the eye 94 to retain same in the socket.

The actual form of each trailer unit is not of prime importance and it could be a chassis with a fixed container thereon or a frame for taking a container with the various coupling means as hereinbefore described positioned at the appropriate places.

The sequence of operations involved in coupling two units 10 and 10' will now be described in detail. The unit 10' which is to be the rear unit is free-standing and the air is allowed to escape from its air bellows 36 so that the rear of the unit will be lower than the front which stands on legs 18. The unit 10 which is to be the front unit is connected to the traction vehicle and the rear of this unit is backed towards the front of the free-standing rear unit 10'. If the front unit were backed squarely on to the front of the rear unit, then the two lower tongues 62 and eye 94 would engage simultaneously in sockets 60 and 92. However, it is extremely difficult to back such a unit squarely on to the stationary unit and therefore, more usually one or other of the lower side coupling means 14 will engage first. In such a case the two units would be out of alignment prior to coupling. Before any tongue 62 engages the corresponding socket 60 it is necessary for the operator to ensure that screw 70 has been moved out of its adjacent socket 60. Moreover, provided that the units are not coupled the lock pin 48 will be engaged between cams 46 preventing tracking of the axle of the front unit. Also, prior to coupling the bellows 36 of the front unit are filled with air and the legs 18 will be off the ground by virtue of the unit being coupled to the traction vehicle. When now a tongue 62 engages the corresponding socket 60, the actuator 68 is operated and thereby air is supplied to the opposite side of piston 56 from compression spring 58 causing the piston 56 and pin 48 to move to the right in FIG. 4 thereby releasing the lock on axle 20 of the front unit 10'. Now the wheels 16 of the front unit 10 are free to alter their angularity relative to the rear unit 10' and so the front unit 10 can now swing into alignment with the rear unit 10'. The eye 84 enters socket 92, and finally the other tongue 62 enters the other socket 60. When eye 94 is entered into socket 92 to a sufficient extent, hook 96 springs upwardly and retains such eye in such socket.

Tongue 62 and eye 94, in entering into their respective sockets, effectively raise the front end of the rear unit causing its legs 18 to lift clear of the ground.

In the next stage of the operation, the driver of the traction vehicle releases the air from the air bellows of the front unit by means of the manually operable tap as hereinbefore described causing the rear of the front unit to fall. Thereby the front of the rear unit and the rear of the front unit come into face-to-face contact causing tongues 88 to enter into top corner sockets 82. Prior to releasing the air from front bellows 36 it may be necessary for the operator to raise the legs 18 of the rear unit to ensure that the top corner tongues 88 enter properly into sockets 82.

The operator next, using the handle for connection to worm 74, screws up screw 70 to cause it to move into socket 60 and thereby retain tongue 62 therein. Upon continued rotation the screw 70 moves into bore 76 thereby raising rod 78 and effecting clamping of tongues 88 in the top corner sockets 82 as hereinbefore described.

At this stage, the operator couples up any electrical and hydraulic couplings which have to be made between the trailer units and the traction vehicle if this is not done automatically. In the present example, it is not envisaged that this coupling will take place automatically but of course the apparatus could be easily modified so that this would take place. Finally, the air release valves of all the bellows 36 are closed enabling such bellows to again be filled with air and the assembly is now ready for transport.

Uncoupling of the two units such as at a distribution depot is carried out according to a procedure which is more or less the reverse of that already described, and briefly is as follows. The operator lowers the legs 18 of the rear unit until they contact the ground. Next the air and electrical connections where necessary are uncoupled and a parking brake is applied to the rear trailer unit. Next, using the handle, the screws 70 are moved downwards. Finally, the front unit 10 is drawn away from the rear one 10' and because of this forward motion the wheels 16 of the front unit 10 will become aligned with the unit and the lock pin 48 will be aligned with the space between cams 46. When the front unit is finally detached from the rear unit 10', the actuator 46 will be released and, therefore, the lock pin 48 will engage between cam surfaces 46.

It will be understood that during travel of the traction vehicle and units coupled thereto, the axle 20 of the front unti will be free to move along track 32 as required for example when the vehicle and trailer units are negotiating a bend and thereby tire scrub of the wheels of the front unit is avoided.

In the coupling and uncoupling of these two units in the example described, operations on the part of the operator are required but of course it is appreciated that by suitable selection of mechanisms, the coupling and uncoupling could if necessary be completely automatic. Many other modifications may be made, for example, the various tongue and slot arrangements can be modified considerably and the locking mechanism for the axle 20 could be other than pneumatically operated.

Moreover, the wheels 16 of any one of the units could be mounted for rotation on king-pins as opposed to a tracking axle as has been described above. As the units are identical, it will be appreciated that it is possible to couple more than two such units end to end and if a third unit were coupled to the rear of the rear trailer then of course the axle of the middle trailer would be free to move on its track. The projecting tongues on the front of each trailer are used for connecting the tractive vehicle to the trailer and it will be appreciated that any single unit may be used with any one tractive vehicle. The advantage of this arrangement is that if for example, three end to end units are transported from say an unloading dock to a distribution depot in any part of the country, upon arriving at such depot, the units can be uncoupled and then each unit can be used separately for general distribution of the goods contained therein. This arrangement would remove the necessity of providing expensive lifting tackle at the distribution depot.

Although the above described units have been described as similar, it is of course possible to provide say a rear unit 10' with an axle or wheels which are fixed at all times and this would be used in the case where such a unit would always be the end unit of units attached end to end. In another possibility, the front unit is provided with wheels which are positionally fixed at all times and the first contact between the two units releases the wheels of the rear unit in order to change their angularity relative to the units they support and again provide ease of coupling.

It will be noticed that any coupling or uncoupling of units according to the present invention, no attaching or detaching of any under carriage legs or axles or even repositioning of such items, is necessary.

I claim:

1. A vehicle trailer unit for coupling end to end with another vericle trailer unit to increase the capacity of a vehicle trailer, said unit having a chassis frame, support wheels at the rear of the unit which also form the running wheels during transport of the trailer unit, support means between the support wheels and the chassis frame to enable the support wheels to change in angularity relative to the chassis frame, locking means holding the wheels in fixed angularity relative to the chassis frame, coupling means at the end of the unit for coupling the end of another unit, a linkage for articulative coupling with a traction vehicle at the end of the unit remote from said coupling means and actuator means at the rear end of the unit operable to release the locking means to render the wheels free to change in angularity relative to the trailer unit, said actuator means being positioned for actuation by the other trailer unit when the two ends are brought together for coupling.

2. A vehicle trailer unit according to claim 1, wherein the support wheels are mounted on an axle and the support means comprises an air bellows suspension, and a curved track on which the axle is movable transversely of the unit.

3. A vehicle trailer according to claim 2, wherein the suspension comprises two spaced assemblies between the axle and curved track, each assembly having an air bellows between an upper bracket provided with rollers which can run on said track when the lock means is released, and a lower bracket attached to the axle.

4. A vehicle trailer unit according to claim 3, wherein each upper bracket has hook plates for engaging over the track to prevent the assemblies from becoming detached from the track.

5. A vehicle trailer unit according to claim 3, wherein there is an A-frame attached to the axle and extending forwardly thereof, the A-frame also being attached, by a pivotal connection, to the chassis frame.

6. A vehicle trailer unit according to claim 5, wherein there are shock absorbers acting between the A-frame and chassis frame tending to centralize the axle so that it lies at right angles to the front or rear direction of the unit.

7. A vehicle trailer unit according to claim 3, wherein the lock means comprises an air cylinder carried by the axle, a piston in the cylinder, a piston rod which forms a lock pin connected to the piston and extending out of the cylinder, and a spring acting on the cylinder to urge the lock pin onto the curved track which track is provided centrally thereof with two spaced cams between which the pin can engage to lock the axle in position.

8. A vehicle trailer unit according to claim 4, wherein there is a manually operable air release valve associated with each bellows.

9. A vehicle trailer unit according to claim 1, wherein the coupling means comprises two similar lower coupling sockets open to the rear and respective sides of the unit to allow for easy entry of a tongue on the front of the other unit to which the unit is to be attached, two similar upper corner coupling sockets open to the rear of the unit and respectively located vertically above the lower coupling sockets, each upper coupling socket being provided with two clamping jaws therein which are for clamping a hook-shaped tongue on the front of the other unit to which the unit is to be coupled.

10. A vehicle trailer unit according to claim 9, wherein there is retaining means associated with the upper and lower coupling sockets at each side of the unit, said retaining means comprising a vertically moveable member which can pass into and through the lower socket and effects clamping of said jaws in the upper socket.

11. A vehicle trailer unit according to claim 10, wherein said member comprises a screw movable vertically by a manually rotatable worm turnable by a detachable handle.

References Cited

UNITED STATES PATENTS

| 2,333,853 | 11/1943 | Fellabaum | 280—423 |
| 2,919,928 | 1/1960 | Hoffer | 280—81 |
| 2,976,051 | 3/1961 | Morey | 280—81 |
| 2,998,261 | 8/1961 | Bartlett | 280—81 |
| 3,102,738 | 9/1963 | De Roshia. | |
| 3,162,320 | 12/1964 | Hitch et al. | 220—23.4 |
| 3,317,219 | 5/1967 | Hindin et al. | 280—415 |
| 3,381,974 | 5/1968 | Carter | 280—81 |

FOREIGN PATENTS 1,078,037  5/1954  France.

LEO FRIAGLIA, Primary Examiner

U.S. Cl. X.R.
220—23.4; 280—81